(12) United States Patent
Bryan

(10) Patent No.: US 6,524,741 B1
(45) Date of Patent: Feb. 25, 2003

(54) BATTERY PACKAGE WITH INTEGRAL DISCONNECT MECHANISM

(75) Inventor: Aiden Bryan, Belfast (IE)

(73) Assignee: Valence Technology, Inc., Henderson, NV (US)

( * ) Notice: Subject to any disclaimer, the term of this patent is extended or adjusted under 35 U.S.C. 154(b) by 65 days.

(21) Appl. No.: 09/645,275

(22) Filed: Aug. 24, 2000

(51) Int. Cl.⁷ .................................................. H01M 2/02
(52) U.S. Cl. ............................ 429/61; 429/162; 429/53
(58) Field of Search ............................. 429/53, 54, 56, 429/162, 59, 61

(56) References Cited

U.S. PATENT DOCUMENTS

| | | |
|---|---|---|
| 4,997,732 A | 3/1991 | Austin et al. |
| 5,300,373 A | 4/1994 | Shackle |
| 5,405,715 A * | 4/1995 | Dawson et al. ................ 429/54 |
| 5,445,856 A | 8/1995 | Chaloner-Gill |

FOREIGN PATENT DOCUMENTS

WO    WO 97/08769    3/1997

* cited by examiner

*Primary Examiner*—Patrick Ryan
*Assistant Examiner*—M. Wills
(74) *Attorney, Agent, or Firm*—Roger A. Williams; Cynthia A. Kovacevic; Michael D. Ross

(57) ABSTRACT

A battery package assembly comprises a package having an interior volume sealingly containing at least one electrochemical cell therein, and opposite polarity electrical connectors adapted to connect said at least one electrochemical cell to an external load. At least one of the opposite polarity electrical connectors is adapted to automatically shut down the battery in response to a sufficient increase in internal pressure within the battery package.

8 Claims, 3 Drawing Sheets

BATTERY PACKAGE WITH INTEGRAL DISCONNECT MECHANISM

FIELD OF THE INVENTION

The present invention relates to a battery package including opposite polarity electrical connectors for connecting at least one electrochemical cell to an external load, at least one of the opposite polarity electrical connectors being adapted to automatically shut down the battery in response to a sufficient increase in internal pressure within the battery package.

BACKGROUND OF THE INVENTION

Non-aqueous electrochemical cells have become the subject of increasing study and development in recent years, owing to their advantages over conventional electrolyte batteries. Particularly promising are non-aqueous cells comprising a cathode including a metal oxide, chalcogenide, or phosphate active material, for instance a lithium metal oxide, a polymer electrolyte, and an anode including an active material capable of storing or releasing ions during cell operation. The particular advantages of non-aqueous metal oxide electrochemical cells include lower weight than conventional liquid-electrolyte batteries, long service life, relatively high energy densities, and relatively high specific energies.

A typical non-aqueous electrochemical cell, such as a rechargeable lithium ion cell, includes, sequentially, a cathode, a separator, and an anode sandwiched together to form the cell. This cell precursor can be extracted and activated with electrolyte to form a functional cell. More particularly, an electrolyte salt solution is imbibed into a polymeric matrix separator, yielding the "activated" functional cell.

A typical electrochemical battery comprises several such electrochemical cells in which the current from the opposite polarity electrodes of each cell is accumulated by current collectors.

Presently favored electrochemical cell types include the "bi-cell," characterized by a central electrode (either anodic or cathodic) flanked by two counter-electrodes. Specifically, a conventional bi-cell comprises, in sequence, a first counter-electrode with a current collector, a first separator, a central electrode with a current collector, a second separator, and a second counter electrode having a current collector.

In order to connect an electrochemical cell to an external load, the cell is provided with electrically conductive connectors or tabs associated with the opposite polarity electrodes of the cell. Typically, the current collectors of an electrochemical cell include integral tab portions or separate, primary current collectors associated with the cell current collectors and comprising tab portions for connecting the cell to an external load. Exemplary electrical connectors for an electrochemical cell stack are described in U.S. Pat. No. 5,300,373, assigned to Valence Technology, Inc., which disclosure is incorporated herein by reference in its entirety.

Electrochemical cells, including bi-cells, may be packaged in flexible, bags, pouches, or other containers. According to this type of packaging, the electrochemical cell is essentially sealingly enclosed within the packaging and a portion of the electrical connectors of the cell protrude therefrom to permit electrical contact between the connector and an external load. The packaging forms an essentially sealed enclosure which impedes or prevents infiltration of air and/or moisture into the package. Exemplary layered laminate packaging materials include, but are not limited to, multilayer plastics and barrier materials described in U.S. Pat. Nos. 4,997,732 and 5,445,856, incorporated herein by reference in their entirety. Such materials prevent, or at least inhibit, transport of electricity, oxygen and water therethrough.

One common problem with the aforementioned flexible type packaging is that as an electrochemical cell is charged above its normal voltage limits (e.g., 4.2V for spinel cathode/graphite anode cell), a number of destructive reactions take place within the cell, releasing unwanted gaseous by-products. With the production of these gases, both pressure and temperature increase within the cell package. Continued gas generation ultimately results in package distortion, cell damage, and even short-circuiting. In the extreme case of a short-circuit, the resultant spark or increased temperature can ignite the gas, thereby causing a fire.

Production controls in the electrochemical cell industry, such as imposed by Underwriter's Laboratories ("UL"), require overcharge testing of flexible-package batteries. For instance, UL overcharge test 1642 requires the cell to be charged to 12 V at a current three times the manufacturer's maximum recommended charging rate. It has proven practically very difficult for flexible-packaging cells to pass these overcharge tests for the aforementioned reasons.

Consequently, it would be expedient to have an effective means of preventing cell damage and short circuiting resulting from overcharging, and to otherwise improve the safety of flexible package type batteries.

SUMMARY OF THE INVENTION

It is accordingly one object of the present invention to provide an improved flexible package type battery whereby the battery is able to automatically shut-down (i.e., become incapable of powering an external load) before the consequences of unwanted pressure build-up (for instance, as a consequence of overcharging) result in battery damage or other undesirable effects.

It is a further object of the present invention to be able to control such automatic shut-down so that the battery is rendered inoperative at a point prior to irreversible battery damage caused by unwanted pressure build-up.

The foregoing objects are achieved through a flexible-package type battery characterized in that the electrochemical cell (which may comprise, for instance, a bi-cell) is automatically rendered inoperative in the event of a sufficient increase in internal pressure within the battery package. This object is achievable by the present invention because, unlike prior art flexible-package type batteries, the battery disclosed herein comprises at least one electrical connecter adapted to automatically shut down the battery in response to a sufficient increase in internal pressure within the package.

According to one feature of this invention, the at least one electrical connector does not comprise unitary, electrical connector fixedly connected to the electrochemical cell and extending therefrom through the package so as to be accessible from the exterior of the package, as is the case with prior art flexible-package type batteries. Rather, the battery of this invention is characterized in that at least one of the electrical connectors comprises separate electrically conductive elements. According to this feature, the battery is further characterized by a first, operative condition wherein these separate electrically conductive elements are in electrically conductive contact, and a second, inoperative condition wherein the separate electrically conductive elements are out of electrically conductive contact in response to a sufficient increase in pressure within the package.

According to another feature of this invention, the first, operative condition of the battery is further characterized by the creation of a sufficient vacuum in the interior volume of the battery package to bring the separate electrically conductive elements into electrically conductive contact.

The electrically conductive elements of the inventive battery may comprise a cell tab associated with the electrochemical cell and disposed entirely within the battery package, and a package tab having a first portion extending into and associated with the package, and a second portion extending outside of the package to connect the battery to an external load. According to this feature, the creation of a sufficient vacuum in the interior volume of the package decreases the internal volume, thus bringing the package tab into electrically conductive contact with the cell tab to render the battery operative. Upon an increase in pressure, for instance as a result of overcharging, the internal volume of the package increases with increasing pressure until the pressure increases is sufficient to move the package tab and cell tab out of electrically conductive contact, thereby rendering the battery inoperative.

According to a further feature of this invention, the separate electrically conductive elements are adapted to remain in electrically conductive contact until the internal pressure in the package increases beyond a predetermined amount. This may be accomplished, for instance, by providing either (or both) of the cell and package tabs with a sprung portion; that is, a portion of the electrically conductive tab adapted to engage the other tab in electrically conductive contact even as the tabs are moved apart in response to an increase in internal pressure in the package.

BRIEF DESCRIPTION OF THE DRAWINGS

FIG. 4A shows a cross-sectional and fragmentary view of the battery package in an operative condition; and FIG. 4B shows a cross-sectional and fragmentary view of the battery package in an inoperative condition.

In FIG. 5A, connector 40 is in a flat condition with its conductive surface exposed. In FIG. 5B, the connector 40 is in a sprung condition and bent in the form of a "V" with its outer insulative layer exposed.

DESCRIPTION OF THE PREFERRED EMBODIMENTS

Figure 1A:
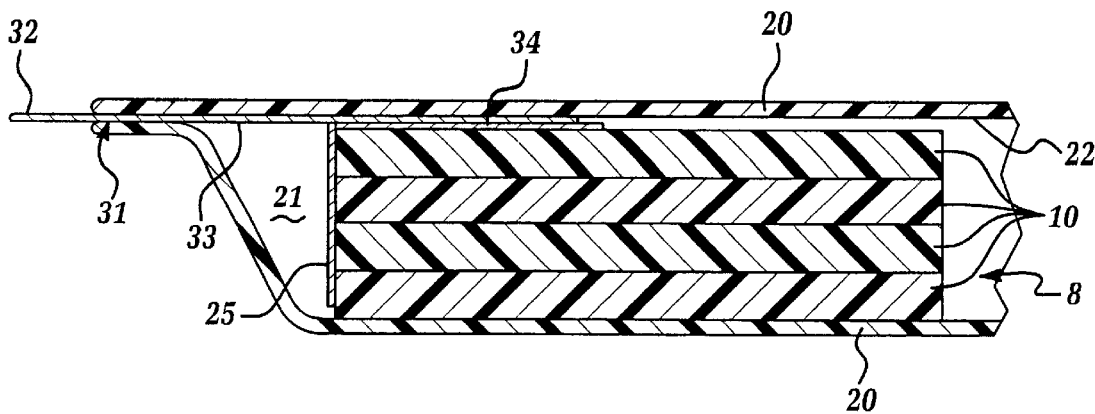
FIG. 1A shows a cross-sectional and fragmentary view of the flexible package battery of the present invention in an operative condition.

Referring now to the drawings, wherein like numerals indicate like or corresponding parts, the battery of the present invention will be seen to most generally comprise a package containing at least one electrochemical cell therein, and opposite polarity electrical connectors adapted to connect the at least one electrochemical cell to an external load, at least one of said opposite polarity electrical connectors adapted to automatically shut down the battery in response to a sufficient increase in internal pressure within the battery package. The package forms an essentially sealed container housing the battery.

FIG. 1A shows a cross-sectional and fragmentary view of an exemplary flexible package type battery of the present invention, including one or more electrochemical cells 10 contained within the interior volume 21 of the package 20, and opposite polarity electrical connectors (only one is shown) associated with the electrochemical cell and including portions thereof extending outside of the battery package for connecting the battery to an external load. At least one of the opposite polarity electrical connectors is adapted to prevent battery operation in response to a sufficient increase in internal pressure within the package. Preferably, one of the electrical connecters comprises separate electrically conductive elements, including in the illustrated form of the invention a package tab 31 including a portion 32 thereof extending outside of the package 20 for connecting the battery to an external load, and a portion 33 thereof disposed in the interior 21 of the package 20, and a cell tab 34 associated with the electrochemical cell 10. The cell tab 34 is in electrical contact with current collector means 25 which are attached to respective cell current collectors (not shown) in battery 8. The package tab 31 most preferably comprises a single, continuous strip or sheet of a suitably conductive material, such as copper. However, it will be appreciated from this disclosure that the electrically conductive elements may comprise separate elements in any number, and arranged in any manner so as to be maintained in electrically conductive contact in a first, operative condition of the battery, and to be out of electrically conductive contact in a second, inoperative condition of the battery.

The electrochemical cell 10 of the illustrated embodiments comprises a stack of cells of known construction; that is, each cell having arranged in sequence an electrode, a separator element, and a counter electrode. The electrode and counter-electrode of each cell further includes a collector; the electrode collectors for each cell being electrically connected, and the counter-electrodes for each cell being electrically connected. Those of skill in the art will appreciate from this disclosure that the type and number of electrochemical cell(s) contained within the package 20 is not limiting of the present invention, which may readily be adapted to any flexible package battery. It will also be appreciated from the remainder of this disclosure that the electrochemical cell may be of any known type and composition which lends itself to flexible packaging and, as used herein, the term "electrochemical cell" is intended to contemplate all such electrochemical cells, whatever their composition or number.

The flexible package 20 of the illustrated embodiments is of known design and construction, comprising most generally a vapor-impervious, non self-supporting material, for instance a sealed foil pouch. Battery packaging of this type may be plastically formed, or may be pouched. Both formed and pouched structures are generally heat-sealed. According to pouched structures, the at least one electrochemical cell is enclosed between heat-sealed laminated layers which form the pouch. The pouch is sealed around the electrical connectors while permitting the connectors to extend from the pouch so that the battery is connectable to an external load.

Battery packaging materials will vary according to manufacturer. However, by way of non-limiting example, in a typical laminate package material, a foil layer is provided centrally in the laminate to render the pouch essentially impermeable to liquid or vapor, and to lend some rigidity to the package. Interiorly of the foil layer is provided an inner strata of material that is non-reactive with the battery electrolyte, for instance a polyamide such as nylon. The inner strata also typically includes a heat-fusible sealing layer, and may further include tie layers (to adhere layers in position), or other layers promoting formation or duration of the laminate material or pouch. On the opposite surface of the foil layer is typically provided an outer laminar strata which serves as a package insulator, provides physical protection for the package, and permits package labeling or marking. While an exemplary flexible package has been described, however, those of skill will appreciate from the remainder of this disclosure that the present invention is well suited to use with any essentially sealable package material.

Electrical connectors are also well known. In a battery structure comprising multiple cells, the comparable current collectors of each cell (anodic or cathodic, respectively) are electrically interconnected. This electrical interconnection may comprise a separate electrical connector, such as a conductive strip of copper wire or sheet, or individual cells may comprise part of a continuous laminate structure folded upon itself such that successive current collecting layers are in electrical contact. The disclosure of U.S. Pat. No. 5,300,373, incorporated herein by reference, teaches one such type of interconnection where a battery comprising a continuous laminate web fan-folded such that opposite polarity electrode segments contact an electrolyte layer on the top and bottom sides of each of the opposite polarity electrode segments. Opposite polarity electrode current collectors are provided. In one arrangement, the cathode current collector is arranged across the cathode layer at each fold thereof in the continuous cathode laminate; and the anode current collector is arranged across individual current collector strips each positioned adjacent an anode segment in the battery structure. Other arrangements are known in the art such as described in the disclosure of International Patent Application WO 97/08769, where a battery comprising multiple individual laminate cells is structured such that the cathode current collector of each cell is in electrical contact, for instance by stacking the individual cells one on top of the other. Each anode includes a separate current collector interconnected by an electrical connector in the form of a strip of conductive material. In one arrangement as described in U.S. Pat. No. 5,300,373, anode current collector means are attached to respective anode current collectors at predetermined locations; and cathode current collector means are attached to the continuous cathode layer current collector at predetermined locations.

Those of ordinary skill will of course appreciate that, when the present invention is employed in conjunction with a battery of multiple cells, those cells can be electrically interconnected in any known manner, consistent with this disclosure. It is further contemplated by the present invention that the cell tab 34 portion of the at least one electrically conductive element may comprise the current collector or collectors of an electrochemical cell, a primary current collector, or other electrically conductive element provided in electrically conductive contact therewith, the invention most generally comprehending the electrical interconnection of the at least one electrochemical cell of the battery with an external load by means of at least one electrical connector adapted to automatically break that electrical interconnection in response to a sufficient increase in internal pressure inside the battery package. It will be readily appreciated that a battery has a positive polarity terminal and a negative polarity terminal, and only one polarity terminal need lose contact with a tab connector to an external circuit to be disabled or inoperative. For illustrative purposes, the invention is described without limitation to a particular polarity. The cut-off arrangement described herein is useable at both anode (negative) and cathode (positive) tab connectors, or at one of them. The cut-off arrangement is preferably utilized at the anode tab connector.

In order to bring the separate electrically conductive elements of the preferred embodiment into electrically conductive contact to define a first, operative condition of the battery, it is preferred that, concurrent with sealing the at least one electrochemical cell 10 within the package 20, at least a partial vacuum is created in the interior 21 of the battery package. The vacuum created in the package is at least sufficient to bring the separate tabs 31 and 34 into electrically conductive contact, as shown in FIG. 1A, so that the battery is operational. As shown, the package tab 31 is most preferably adhered to the interior surface 22 of the package 20. Upon creating the sufficient vacuum in the package 20, the interior volume 21 decreases as the package is drawn inwardly so that the package tab 31 is brought into contact with the at least one electrochemical cell 10.

Figure 1B:
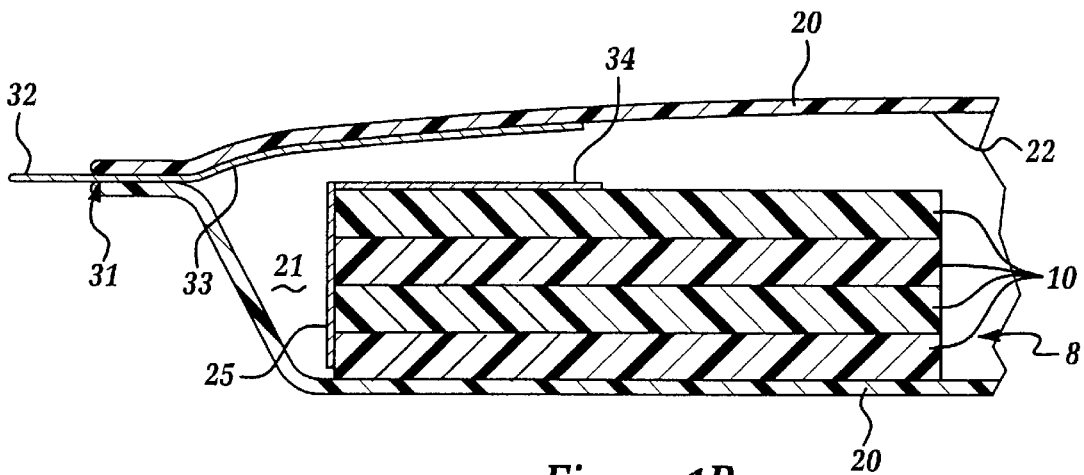
FIG. 1B shows a cross-sectional and fragmentary view of the battery package of the present invention in an inoperative condition.

During overcharge conditions, that is, where the battery is charged above its normal voltage limits undesirable reactions take place within the cell and gaseous by-products are produced. Pressure and temperature both increase within the cell package as a result of this gas production, which can ultimately lead to package distortion, cell damage, and short-circuiting. The unique electrical connector arrangement of this invention, as described herein, cause reduction in electrical contact until such contact is completely broken. More specifically, electrically conductive contact exists between the electrically conductive elements 31 and 34 in an operative condition of the battery, such as the preferred form of creating a sufficient vacuum within the interior volume 21 of the flexible package 20. It will be appreciated that the production of gas during overcharging conditions reduces or destroys that at least partial vacuum, causing an expansion in the package 20 such that electrically conductive contact between the elements 31 and 34 is lost and the battery is rendered inoperative. FIG. 1B.

It will also be appreciated that, according to the preferred form of the invention, the battery will also be rendered inoperative in the event that the integrity of the package 20 is compromised (e.g., by rupturing, cutting open, etc.). In that event, the internal vacuum lost by the influx of air, thereby increasing the internal pressure and breaking electrically conductive contact between the electrically conductive elements 31 and 34.

Of course, the present invention need not rely on the creation of a sufficient vacuum within the battery package 20 in order to bring the electrically conductive elements into electrically conductive contact to define the operative condition of the battery in a timely and effective manner. Thus, for instance, electrically conductive contact between the separate electrically conductive elements (e.g., 31 and 34) may be effected by such means as initially gathering or folding the package 20 to provide the requisite electrically conductive contact while allowing for package expansion and automatic shut-down (i.e., separation of the electrically conductive elements) in the event of positive pressure build-up. Alternatively, the separate electrically conductive elements could be provided initially in electrically conductive contact by means of a suitable adhesive or other physical connection adapted to permit separation, and thus automatic battery shut-down, upon a sufficient increase in pressure inside the battery package. In view of this disclosure, those of skill in the art will appreciate that these and a variety of other mechanisms may be employed consistent with the broad teaching of this disclosure to provide for automatic separation of the separate electrically conductive elements in response to a sufficient increase in internal pressure.

Figure 2:
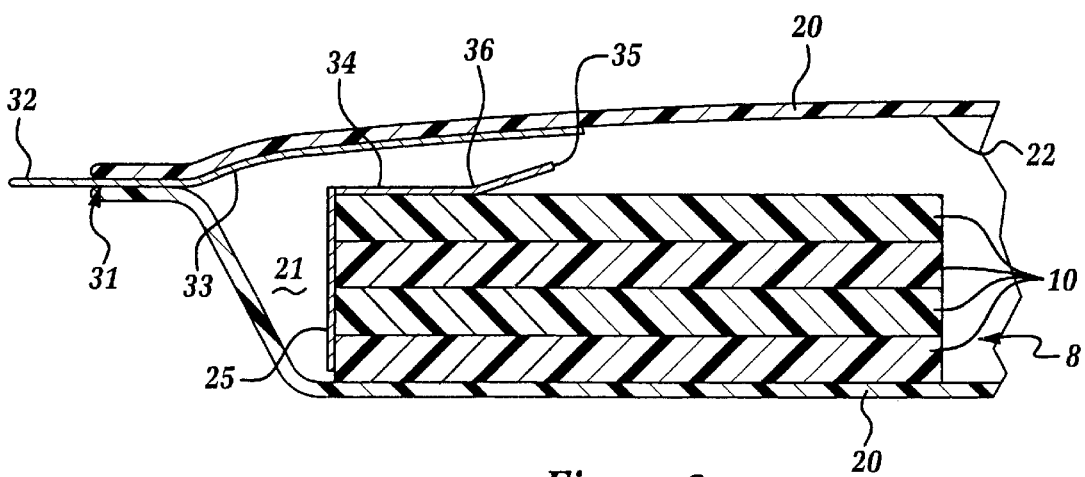
FIG. 2 shows an alternate embodiment of the flexible package battery of the present invention.

According to another embodiment of the present invention, the separate electrically conductive elements are adapted to remain in electrically conductive contact until the internal pressure within the battery package increases beyond a predetermined amount. Generally speaking, this is preferably accomplished by biasing one or both of the separate electrically conductive elements towards the other so that battery remains in the first, operative condition thereof until the increasing pressure increases beyond a predetermined amount of pressure corresponding to an increased interior volume where the conductive elements are no longer in contact. A preferred form of this embodiment is shown in FIG. 2, according to which the cell tab 34 includes a sprung portion 35, which sprung portion comprises a portion of the cell tab 34 bent at position 36 and extending upwardly therefrom away from the electrochemical cell 10. The position 36 defines a living hinge along which the sprung portion 35 is flexibly pivotable from the biased position of FIG. 2. In operation of the most preferred form of the invention, the creation of an at least partial vacuum within the package 20 is sufficient to bring the package tab 31 into conductive contact with the cell tab 34 as shown in FIG. 1A, thereby urging the sprung portion 35 biased against the pressure of the package tab 31. As pressure increases within the package 20, such as during overcharge or other battery malfunction that generates unwanted gas, the interior volume 21 of the package increases and the package tab 31 is consequently moved away from the cell tab 34. However, the sprung portion 35, being naturally biased towards the extended position thereof (FIG. 2), maintains electrically conductive contact with the package tab 31 until, by virtue of the increasing pressure in the battery package, the package 20 volume expands and moves the package tab 31 a distance from the cell tab 34 greater than the upward length of the sprung portion 35, where after the battery is rendered inoperative.

The sprung state is shown in FIG. 2 where there is a distance between interior portion 33 of package tab 31 and sprung portion 35 of cell tab 34.

Consequently, electrically conductive contact between the conductive elements 31 and 34 can be maintained up to a desired point during an increase in internal pressure in the battery package. It will be appreciated from the foregoing that the point at which the conductive elements 31 and 34 are out of electrical contact, and thus the point at which the battery ceases to operate, will depend on the dimensions of the sprung portion 35. Most preferably, the sprung portion 35 is of such dimensions as to permit battery operation to a point just prior to a condition of internal pressure and temperature, represented by the internal volume of the package 20, where irreparable battery damage, such as permanent package distortion or permanent electrochemical cell damage, starts to occur.

Experimental Results

Twenty laminate batteries were constructed according to the above-described embodiment of FIGS. 1 and 2. To avoid cell disconnect during conditioning, clamps were placed on the cells above the anode area to hold the conductive members 31 and 34 together. The batteries displayed slightly higher initial impedance values (by up to about 7 mΩ) than conventional flexible package batteries, a result which may be attributable to the fact that only a slight vacuum was created in the battery packages for performance evaluation.

Ten of the aforementioned batteries were subjected to overcharge to 12 Volts at a current of 4.5 Amps, in accordance with UL 1642.

Figure 3:
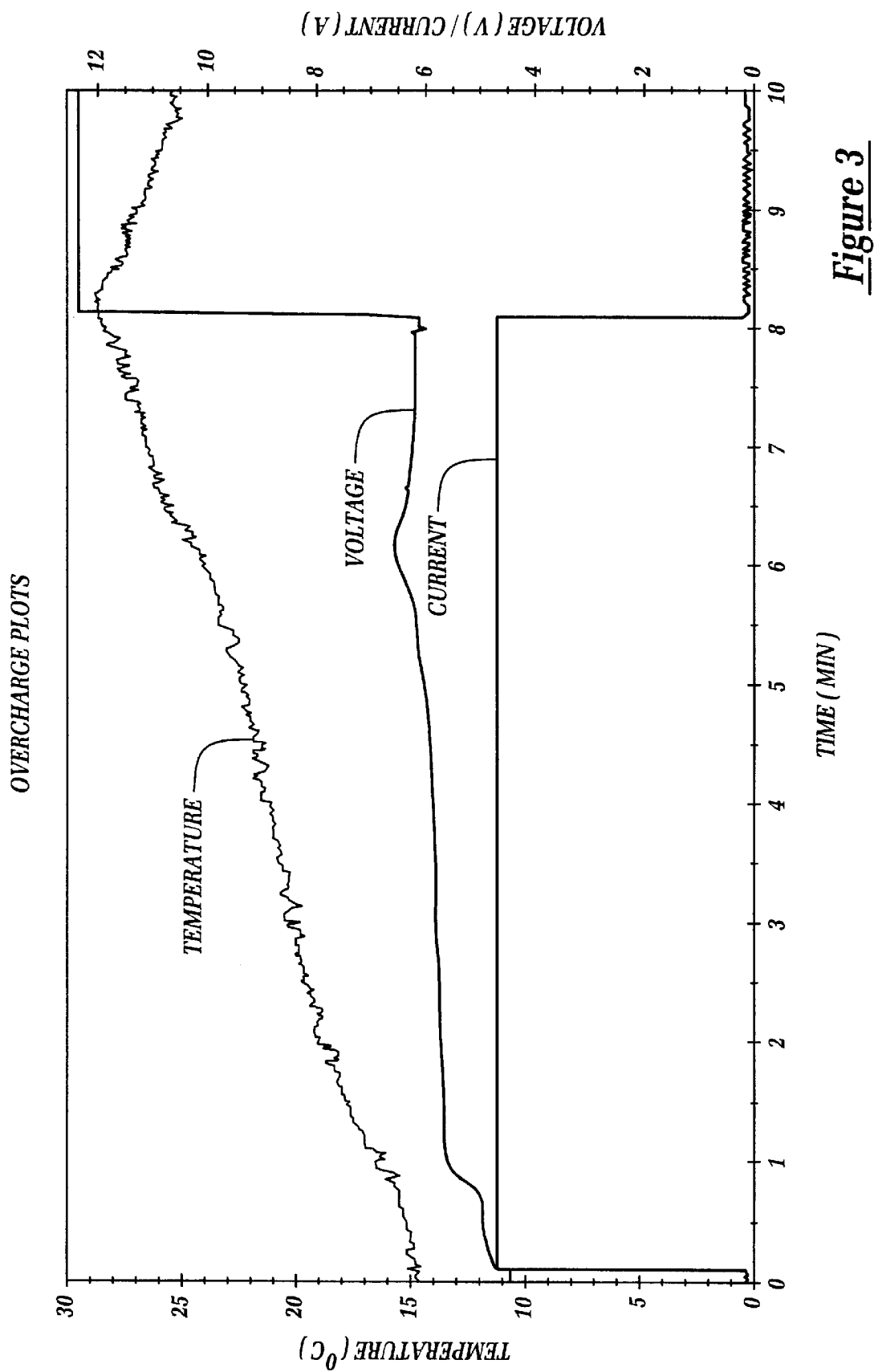
FIG. 3 is a plot of temperature, current, and voltage data for overcharge testing performed on flexible package batteries of the present invention.

Referring to FIG. 3, the results of overcharge testing are shown. Upon filling with gas sufficient to separate the conductive elements (time=after about 8 to 12 minutes), the voltage went to 12 Volts and the current fell immediately to 0. At this point, cell temperatures fell; upon shutdown, cell temperatures were on the order of between 26° C. and 35° C. See Table I.

TABLE I

| Cell No. | Initial Temp. (° C.) | Max. Temp. (° C.) | Initial Voltage (V) | Max. Voltage (V) |
| --- | --- | --- | --- | --- |
| 1 | 16 | 27 | 4.11 | 6.11 |
| 2 | 15 | 28 | 4.09 | 6.4 |
| 3 | 19 | 34 | 4.11 | 5.7 |
| 4 | 18 | 37 | 4.10 | 5.9 |
| 5 | 17 | 34 | 4.11 | 5.6 |
| 6 | 17 | 28 | 4.11 | 6.1 |
| 7 | 21 | 30 | 4.12 | 5.9 |
| 8 | 21 | 34 | 4.11 | 5.9 |
| 9 | 18 | 33 | 4.11 | 5.8 |
| 10 | 18 | 34 | 4.11 | 6.2 |

Battery shutdown of the tested cells occurred in a completely safe manner, and all ten of the tested cells passed overcharge evaluation under UL 1642. Post-testing analysis revealed that the tested cells sustained no obvious physical damage.

Figure 4A:
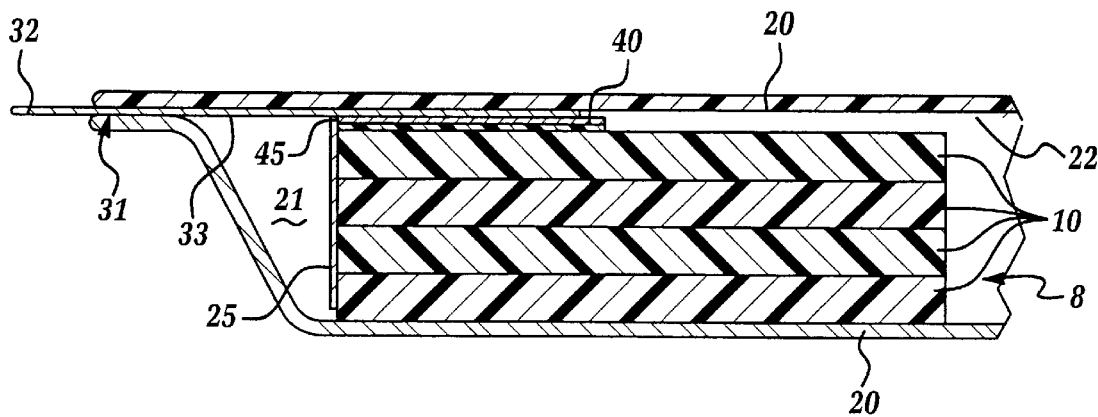
FIGS. 4A and 4B show another alternate embodiment of the battery package of the invention.
Figure 4B:
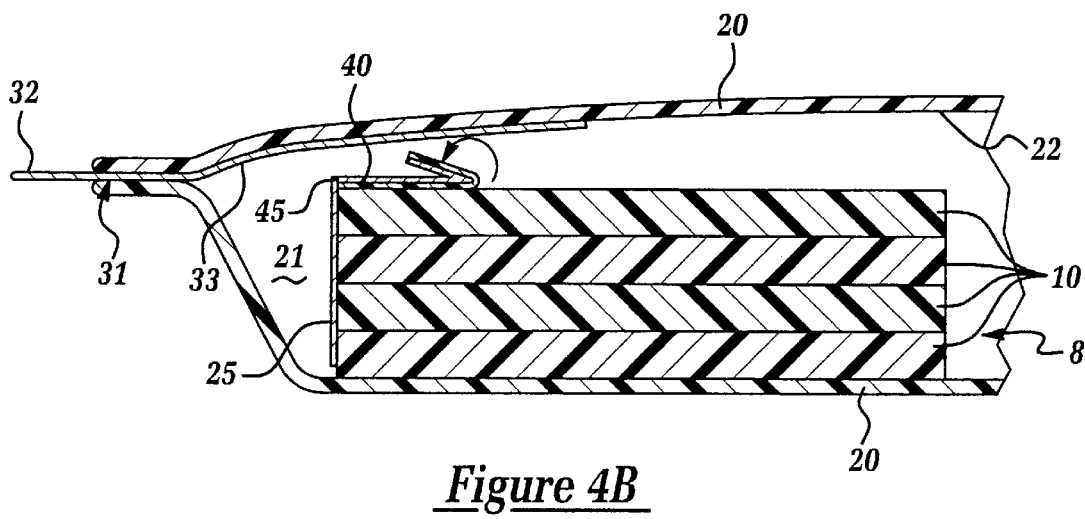
Figure 5A:
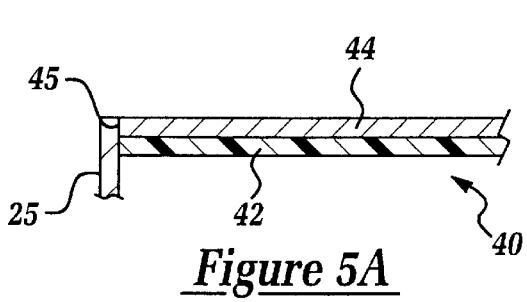
FIGS. 5A and 5B show respective views of electrically conductive connector 40.
Figure 5B:
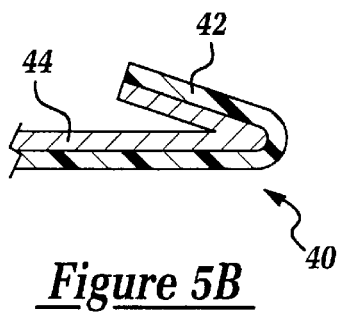

According to still another embodiment of the invention, the cell tab 40 as per FIGS. 4A, 4B and 5, includes an electrically conductive portion 44 and an electrically insulative portion 42. This embodiment utilizes such cell tab 40 in a stressed condition biased against portion 33 of tab 31 to provide electrical connection (FIGS. 4A, 5A) and in an insulative sprung condition (FIGS. 4B, 5B).

When in normal operation, as illustrated in FIG. 4A, the insulated sprung connector 40 allows the electrical connection to be made, as the conducting portion 44 of connector 40 contacts the conductive interior portion 33 of package tab 31. The insulating portion 42 of the connector 40 is facing or adhered to the stack of cells 10 which comprise the battery 8. The connector 40 has a conductive edge 45 which provides an electrically conductive path from current collector means 25 to conducting section 44 of connector 40 and to conductive interior portion 33 of package 31 as shown in FIGS. 4A and 5A.

When the battery 8 is in an abnormal mode of operation, the vacuum is lost (FIG. 4B). Under these conditions, the connector 40 springs back to expose the insulated portion 42 of the connector tab 40 to the conductive interior portion 33 of tab 31. Thus, in addition to the electrical connection being broken, the insulating portion 42 remains in an exposed position facing the interior portion 33 of package tab 31. The disconnection can then be regarded as non-reversible.

FIG. 5 shows two views of the connector 40. In FIG. 5A, connector 40 is in a flat condition with its conductive surface or layer 44 fully exposed and essentially planar, thereby providing conductive surface area for contact with conductive interior portion 33 of package tab 31 as in FIG. 4A. As described above, the connector 40 is in a stressed condition, laying flat against tab 31 (FIGS. 4A, 5A). In FIG. 5B, the connector 40 is in a sprung condition and bent in the form of a "V" with the outer insulative layer 42 exposed to conductive interior portion 33 of package tab 31 (FIGS. 4B, 5B). The inner electrically conductive layer 44 forms the inner part of the "V."

Those skilled in the art will appreciate that the new device of FIGS. 4 and 5, with the insulation, will give complete, irreversible cut-off. The device of FIGS. 1 and 2, which had no insulation, provides cut-off which may be considered to be reversible. This is because although the cell will totally shutdown, no current passing between the tabs when the tabs are separated, this can be reversed if the tabs are again brought into contact. This contact may be reinstituted if the package is evacuated and placed under vacuum again.

If the tab is insulated (FIGS. 4 and 5), then either electrode, or both, can be used as the disconnection electrode as the insulation protects the tab from the upper electrode surface. If the disconnect tab is not insulated (FIGS. 1 and 2), then the disconnection tab that lays on the top electrode must be of the same type (polarity) as the electrode. For example, if the top electrode is the anode, the disconnection tab must be the anode tab, otherwise there is a short circuit between the anode and the cathode. Similarly, if the top electrode is a cathode, then the disconnection tab must be a cathode. The designation top and bottom is used here for directional convenience only and the invention is not limited thereby.

It will be understood from the foregoing examples of the invention that a particular flexible package battery is illustrated, and variations thereto may be effected as necessary in the employment of this invention in any given battery. Such variations and modifications can be made by those skilled in the art without undue experimentation from the disclosed invention in the embodiment above, and nothing in the foregoing description is intended to limit the invention beyond the scope of the following claims.

What is claimed is:

1. A battery assembly for providing electrical energy to an external load, comprising:
   an expandable package containing an electrochemical cell therein; and
   opposing polarity electrical connectors in electrical communication with said electrochemical cell for electrically connecting said electrochemical cell to the external load, at least one of said electrical connectors comprising:
      an electrically conductive package tab associated with said package and movable therewith, and
      an electrically conductive cell tab associated with said electrochemical cell, said cell tab comprising a biased portion in interruptible electrical contact with said package tab, said cell tab biased portion movable from a biased position to an extended position;
   whereby when said package expands outwardly and said package tab moves therewith, said cell tab biased portion moves with said package tab while maintaining electrical contact therewith, and when said package further expands outwardly and said cell tab biased portion moves to said extended position, said package tab moves out of electrical contact with said cell tab biased portion, thereby rendering said battery assembly inoperative.

2. The battery assembly of claim 1, wherein said biased portion comprises a bent portion of said cell tab extending away from said electrochemical cell.

3. A battery assembly for providing electrical energy to an external load, comprising:
   an expandable package containing at least one electrochemical cell therein; and
   opposing polarity electrical connectors in electrical communication with said electrochemical cell for electrically connecting said electrochemical cell to the external load, at least one of said electrical connectors comprising:
      an electrically conductive cell tab associated with said electrochemical cell, and
      an electrically conductive package tab associated with said package and movable therewith, said package tab comprising a biased portion in interruptible electrical contact with said cell tab, said package tab biased portion movable from a biased position to an extended position;
   whereby when said package expands outwardly and said package tab moves therewith, said package tab biased portion moves while maintaining electrical contact with said cell tab, and when said package further expands outwardly and said package tab biased portion moves to said extended position, said package tab biased portion moves out of electrical contact with said cell tab, thereby rendering said battery assembly inoperative.

4. The battery assembly of claim 3, wherein said biased portion comprises a bent portion of said package tab extending toward said electrochemical cell.

5. A battery assembly for providing electrical energy to an external load, comprising:
   an expandable package containing at least one electrochemical cell therein; and
   opposing polarity electrical connectors in electrical communication with said electrochemical cell for electrically connecting said electrochemical cell to the external load, at least one of said electrical connectors comprising:
      an electrically conductive package tab associated with said package and movable therewith, and
      an electrically conductive cell tab associated with said electrochemical cell, said cell tab comprising a biased portion having an electrically insulative portion and an electrically conductive portion for providing interruptible electrical contact with said package tab, said cell tab biased portion movable from a biased position to an insulative position interposing said insulative portion between said electrically conductive portion and said package tab;
   whereby when said package expands outwardly and said package tab moves therewith, said cell tab biased portion moves with said package tab while maintaining electrical contact therewith, and when said package further expands outwardly and said cell tab biased portion moves to said insulative position, said insulative portion is interposed between said package tab and said cell tab conductive portion, thereby rendering said battery assembly inoperative.

6. The battery assembly of claim 5, wherein said biased portion comprises a bent portion of said cell tab extending away from said electrochemical cell.

7. A battery assembly for providing electrical energy to an external load, comprising:

an expandable package containing at least one electrochemical cell therein; and opposing polarity electrical connectors in electrical communication with said electrochemical cell for electrically connecting said electrochemical cell to the external load, at least one of said electrical connectors comprising:
   an electrically conductive cell tab associated with said electrochemical cell, and
   an electrically conductive package tab associated with said package and movable therewith, said package tab comprising a biased portion having an electrically insulative portion and an electrically conductive portion for providing interruptible electrical contact with said cell tab, said package tab biased portion movable from a biased position to an insulative position interposing said insulative portion between said electrically conductive portion and said cell tab;

whereby when said package expands outwardly and said package tab moves therewith, said package tab biased portion moves while maintaining electrical contact with said cell tab, and when said package further expands outwardly and said package tab biased portion moves to said insulative position, said insulative portion is interposed between said cell tab and said package tab conductive portion, thereby rendering said battery assembly inoperative.

8. The battery assembly of claim 7, wherein said biased portion comprises a bent portion of said package tab extending toward said electrochemical cell.

* * * * *